United States Patent Office 3,764,316
Patented Oct. 9, 1973

3,764,316
ORGANIC PHOTOCONDUCTIVE MATERIAL COMPRISING POLY (VINYL-MONOIODO BENZOCARBAZOLE)
Earl E. Dailey, South Euclid, and Jerry M. Barton, Highland Heights, Ohio, Ralph L. Minnis, Des Plaines, Ill., and Evan S. Baltazzi, Northfield, Ohio, assignors to Addressograph-Multigraph Corporation, Cleveland, Ohio
No Drawing. Continuation-in-part of abandoned application Ser. No. 29,271, Apr. 16, 1970. This application May 30, 1972, Ser. No. 257,962
Int. Cl. G03g 5/06
U.S. Cl. 96—1.6                     24 Claims

ABSTRACT OF THE DISCLOSURE

An electrophotographic member having a rapid photoresponse in which the photoconductive layer is a monoiodo substituted (vinyl-benzocarbazole) polymerized through the vinyl radical and applied to a conductive support such as aluminized polyester film. Polymerization produces poly(vinyl-monoiododibenzo carbazole) such as poly(7-vinyl-10-iodo-7H-benzo[c]carbazole). The relative viscosity range of the useful photoconductive polymers is in the range of 1.3 to 5.0. The iodinated benzocarbazole polymers are applied to the base supports at a rate sufficient to produce a coating weight (dry basis) in the range of 0.1 gram to 2.0 grams per square foot on a dry coating thickness of .05 mil to 1.00 mil.

REFERENCE TO COPENDING APPLICATION

This application is a continuation-in-part of our copending application Ser. No. 29,271, filed Apr. 16, 1970, now abandoned.

BACKGROUND OF THE INVENTION

This invention relates generally to polymeric polynuclear heterocyclic aromatic compounds as organic photoconductors and more particularly to polymeric vinyl benzocarbazoles having substituents introduced into the arenic ring structures.

The use of poly (N-vinyl benzocarbazoles) as photoconductive materials is fully disclosed in U.S. Ser. No. 698,420, filed Jan. 17, 1968, now abandoned, in the name of Printy et al.

The mechanism whereby certain organic materials function as photoconductors involves electron donor-electron acceptor type reactions. It is generally proposed that electrophotographic members which comprise an organic photoconductor and a sensitizer, such as an electron acceptor, form charge transfer complexes. The complex formation occurs between the polymeric electron donor and the strong electron acceptor so that they are bound in attraction.

Irradiation of a member containing organic photoconductors and strong electron acceptors with polychromatic light causes formation of electron hole pairs which are charge carriers. The charge carriers then migrate toward the oppositely charged layers and are neutralized.

The photoconductive medium usually comprises a conductive support to which has been applied a photoconductive layer of film, which in the instant invention is an organic photoconductive material.

SUMMARY OF THE INVENTION

It has been found that introduction of certain substituents into the fused ring structure, such as, an atom of iodine, modifies the photoresponsive characteristics of the polymer increasing its light decay properties to electromagnetic radiation.

The new photoconductive materials of the instant invention comprise an organic photoconductive polymer having the general formula:

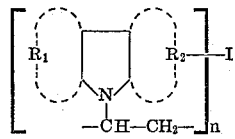

in which $R_1$ and $R_2$ are fused arenic ring structures having 4 to 8 carbon atoms, one of said fused arenic ring structures having at least 8 carbon atoms and wherein one of said ring structures is substituted with an atom of iodine, $n$ is an integer greater than one.

The support on which the photoconductive polymeric material is applied may be paper, which has been treated to render it conductive, or it can be metal or a metal foil such as aluminum, copper or zinc. The use of a polyester film which has been metalized has produced excellent results as a conductive support because it is dimensionally stable and at the same time possesses all of the advantages of a sheet of paper. It is essential that the support have a range of conductivity from $10^{-11}$ mhos./cm. to the conductivity of the metal.

It is a general object of the present invention to provide improved photoconductive materials which have an increased photoresponse.

It is a specific object of the present invention to provide an iodinated organic photoconductive material in which the iodine is substituted into the fused ring structure so as to give improved photoconductive response.

It is a still further object of the present invention to provide an improved method of making reproductions by photoelectrostatic techniques employing monoiodinated polyvinyl benzocarbazole as the photoconductive material whereby the photoconductive member has increased light decay rates.

DESCRIPTION OF THE INVENTION

The following is a partial list of the typical polynuclear heterocyclic organic polymeric compounds that are representative of the photoconductive materials of this invention.

poly(6-vinyl-monoiodo-6H-dibenzo[b,h]carbazole)
poly(7-vinyl-monoiodo-7H-dibenzo[b,g]carbazole)
poly(5-vinyl-monoiodo-5H-benzo[b]carbazole)
poly(7-vinyl-monoiodo-7H-benzo[c]carbazole)
poly(7-vinyl-monoiodo-7H-dibenzo[c,g]carbazole)

The monomeric polynuclear aromatic compounds are prepared by the treatment of the appropriate aromatic compound, such as, substituted naphthalene with an appropriate aryl hydrazine in the presence of alkaline bisulfite followed by acid hydrolysis which produces the corresponding arocarbazoles described herein (Beilstein, Organische Chemi, vol. 20, pages 494 and 495).

The polymeric iodinated fused arenic ring compounds represented by the general formula can be prepared by several methods. Thus, treatment of the appropriate substituted naphthalene derivative with an arylhydrazine in the presence of alkaline bisulfite followed by acid hydrolysis affords benzocarbazoles (N. L. Drake, Organic Reactions, vol. 1 (R. Adams edition) by John Wiley & Sons, Inc., New York, 1942, page 114).

These benzocarbazoles upon treatment with 2-chloroethyl p-toluene sulfonate are substituted on the nitrogen atom and give N-substituted 2-chloroethyl compounds. Iodinization of these N-(2-chloroethyl) benzocarbazoles, e.g. by potassium iodide-potassium iodate in acetic acid affords the N - (2 - chloroethyl) - iodobenzo - carbazoles which are selectively dehydrohalogenated to the corresponding N-vinyl derivatives.

Alternatively, the benzocarbazoles can be iodinated and the resulting iodobenzocarbazoles can be converted to vinyl compounds using the 2-chloroethyl toluene sulfonate method or by treatment with acetylene (Kirk-Othmer Encyclopedia of Chemical Technology, vol. 11, page 655). Other methods of preparing the disclosed compounds will be apparent to those skilled in the art.

Polymerization of N-vinyl arocarbazole monomers may be accomplished by known techniques such as bulk, solution, suspension, or emulsion polymerization, using as a catalyst known radical forming agents, such as, peroxides, azo compounds or ionic catalysts, such as, for example boron trifluoride.

In the bulk polymerization process the monomer, such as an N-vinyl benzocarbazole, is reduced to its molten state and the radical forming agent such as azobisisobutyronitrile or peroxide such as benzoyl peroxide added and when the polymerization is completed, the product thus obtained is purified by dissolving it in a solvent and precipitating with a non-solvent. The degree of polymerization is controlled by the reaction conditions, such as, temperature, type of solvent and quantity of catalyst that is employed.

An indication of the degree of polymerization is obtained by relative viscosity values. Using this measure it has been found that polymers which have a relative viscosity value above 1.0 in cholrbenzene were operable. Good results were obtained with polymers falling in the relative viscosity range of 1.3 to 5.0.

In order to prepare the photoconductive members of this invention, the purified polymeric material is dissolved in chlorobenzene or tetrahydrofuran and applied to a suitable support base such as an aluminized Mylar film having a thickness of about three mils.

The polymeric material is applied to the aluminized surface by conventional coating techniques, such as a wire wound rod or trailing blade coater, at a rate which is in the range of 0.1 gram to 2.0 grams per square foot, on a dry basis, preferably in the range of 0.1 gram to 0.5 gram per square foot to produce a film thickness in the range of 0.05 mil to 1.0 mil, preferably in the range of 0.15 to 0.3 mil.

The coated film is exposed to forced air drying to remove the solvent from the photoconductive layer. The photosensitivity of the photoconductive materials prepared by the foregoing general techniques is such that they respond to radiation in the ultraviolet portion of the spectra. It is desirable in photoreproduction systems to use ordinary tungsten-type filament sources. Therefore, it is desirable to extend the photosensitivity of these materials to the visible portion of the spectrum. Tungsten-type filament lamps emit radiation from the ultraviolet range to the near infrared, ranging from 360 millimicrons to 725 millimicrons. The extension of the photosensitivity is generally known to be accomplished by the addition of small amounts of sensitizers, which may be either chemical sensitizers, such as π-type acids which are strong electron-acceptors or dye sensitizers of the type generally described in U.S. Pat. No. 3,052,540.

A list of π-type acids which may be used as sensitizers is provided below. It is by no means exhaustive and merely exemplary of the type of materials that may be used. The amount of π-acid type sensitizers employed may range from 0.01% to 110% by weight of the photoconductive polymer, the preferred range being between 1.0% and 100% by weight of the polymeric photoconductive material present in the photoconductive layer. The concentration of acceptor which is to be used will depend on the application for which the photoconductive member is to be used. In a system where the powder image is to be created on the photonconductive surface and then transferred to a receiving sheet the proper photosensitivity. In the circumstances that the photoconductive member is to be used as an original in a projection system then lower concentrations may be used in order to preserve the light transmission properties of the photoconductive member since at the higher concentrations of acceptor the photoconductive layer becomes less translucent.

Another way of designating the concentration of π-acid sensitizer is in terms of the mole percent. Based on the molecular weight of the monomeric form of the photoconductive polymer the moles of sensitizer present is expressed in terms of 100 moles of the photoconductive monomer.

When using organic dyes as the sensitizer the amount which will give the desired increase in photosensitivity is in the range from 0.01% to 5.0% by weight of the weight of polymer, the preferred range being from 0.2% to 2.0%.

CHEMICAL SENSITIZERS (a) Anhydrides:
   (1) Tetrachlorophthalic anhydride
   (2) Napthalene-1,4,5,8-tetracarboxylic acid dianhydride (b) Cyanocarbons:
   (1) Tetracyanoethylene
   (2) 7,7,8,8-tetracyanoquinodimethane (c) Quinones:
   (1) Chloranil
   (2) 2,3-dichlorodicyano-1,4-benzoquinone
   (3) Phenanthrenequinone (d) Nitroaromatics:
   (1) 1,3,5-trinitrobenzene
   (2) 9,10-dibromoanthracene
   (3) 2,4,7-trinitrofluorenone
   (4) 2,4,7-trinitrofluorenonemalononitrile
   (5) 2,4,5,7-tetranitrofluorenone
   (6) 4-iodo-2,5,7-trinitrofluorenone
   (7) 2,7-dinitrofluorenonemalonontrile (e) Oxazalones:
   (1) 2-(p-t-butyl phenyl)-4-(2,4,7 - trinitrofluorenylidene)-2-oxazolin-5-one
   (2) Naphthalene-1,4,5,8-tetracarboxylic acid dianhyidene)-2-oxazolin-5-one
   (3) 2-(o-acetoxyphenyl)-4-(2,7-dinitro-9 - fluorenylidene)-2-oxazolin-5-one
   (4) 2-(o-methoxyphenyl)-4-(2,4,7-trinitro - 9 - fluorenylidene)-2-oxazolin-5-one
   (5) 2-(p-chlorophenyl)-4-(2,4,7-trinitro-9 - fluorenylidene)-2-oxazolin-5-one
   (6) 2-(p-fluorophenyl)-4-(2,4,7-trinitro-9-fluorenylidene)-2-oxazolin-5-one
   (7) 2-(m-trifluoromethylphenyl)-4-(2,4,7-trinitro-9-fluorenylidene)-2-oxazolin-5-one
   (8) 2-phenyl-4-(2,7-dinitro-4-iodo-9-fluorenylidene)-2-oxazoline-5-one(cis) (trans)
   (9) 2-benzyl-4-(2,4,7-trinitro-9 - fluorenylidene) - 2-oxazolin-5-one
   (10) 2-styryl-4-(2,4,7-trinitro-9 - fluorenylidene) - 2-oxazolin-5-one
   (11) 4-benzylidene-2-phenyl-2-oxazolin-5-one
   (12) 2-phenyl-4-(2,4-dinitro-9 - fluorenylidene) - 5-oxazolone
   (13) 2-phenyl-4-(2,7-dinitro-9 - fluorenylidene) - 5-oxazolone The following is a list of the dyes which have been used successfully to sensitize the photoconductive members. It will be appreciated the mechanism whereby the photosensitivity is increased using organic dyes differs significantly from the mechanism when using acceptor type compounds.

DYE SENSITIZERS

Acridine Red
Alizarin Violet
Authraquinons Iris
Auranine
Basic Blue DSC
Brilliant Green
Celestine Blue
Crystal Violet (acetate)
Crystal Violet (bromide)
Crystal violet (chloride)
Crystal Violet (iodide)
Crystal Violet (nitrate)
Ethyl Violet
Grasal Red GBN
2-(d-isopropyl-w-phenylbatadienyl) benzopyryliune perchlorate
Kryptoyanine
Maladule Green (chloride)
Maladule Green (oxalate)
Methylene Blue
Methyl Green
Methyl Violet
New methylene Blue
Nigrosene base BB Blue shade
Nigrosene SS Jet shade
Oil Blue A
Opal Blue SS
Pendalyanal
Propyl Violet
Purpurin
Pyraniny
Rhodamine B base
Rhodamine B stearate
Rhodamine FB
Rhodamine F3B
Rhodamine F4G
Rhodamine GGDN extra
Rhodamine S
Rhodamile Blue
Rose Bengal
Safranine T extra
Solopheyl Turquoise Blue GRL
Sudan Black BR
Sudan Yellow GRN
Spiril soluble fast Orange
4,4¼″ trimethoxytrityl chloride
Victoria Blue In evaluating the photosensitivity of the materials, they are charged to the saturation voltage level which value is identified as $V_0$ and exposed to 8 foot candles of electromagnetic radiation of the type emited by a constant temperature tungsten filament lamp rated at 2800° K.

The photosensitivity is the time in seconds required to decay the charge from the $V_0$ level to ½ $V_0$. The photoconductors prepared according to the procedures set forth herein have photosensitivities which are 80% to 100% faster than the corresponding non-substituted compounds.

The specific and detailed procedures for the preparation of the photoconductive members of this invention are described in the following examples.

EXAMPLE I

A photoconductive member using poly(monoiodo-N-vinyl-7H-benzo[c]carbazole).

Fifty-six grams of 7 - (2-chloroethyl-7H-benzo[c]carbazole) (0.2 mole) prepared in accordance with the general method described hereinabove is reacted with equal molar amounts (0.11 mole) of potassium iodide (18.3 grams) and potassium iodate (23.5 grams) in 700 cc. of acetic acid.

The reaction mixture becomes a deep purple color in the presence of the potassium iodide and potassium iodate and the reaction is heated to boiling under reflux for a period of one hour after the deep purple color subsides.

The reaction mixture is cooled and the reaction product is collected and washed with a mixture of methanol and water and air dried. The dried residue is recrystallized from acetone providing a yield of 52.3 grams of iodo-7-(2-chloroethyl)-7H-benzo[c]carbazole.

The vinyl monomer is prepared by reacting the recrystallized iodo-7-(2-chloroethyl - 7H - benzo[c]carbazole (40.6 grams, 0.1 mole) with potassium hydroxide (60 grams) isopropyl alcohol (600 ml.) and methanol (150 ml.) under reflux for 4.5 hours. The mixture is cooled and diluted with 1.5 liters of water. The solid material is collected on a Büchner funnel and washed with equal volumes of water-methanol mixture and then recrystallized from acetone. The yield of purified iodo-7-vinyl - 7H - benzo[c]carbazole, melting point 128–130° C. is 25–30 grams.

Polymerization of the iodinated monomer is accomplished by free radical solution polymerization. Into a 3-necked round bottom 500 ml. flask is charged 30 grams of the monomer dissolved in 150 ml. of chlorobenzene reagent grade and placed under reflux. A solution 3.030 gram azobisdiisobutyronitrile in 50 ml. reagent grade chlorobenzene is added to the reaction flask maintained at 80° C. over a one hour period. The reaction is continued for six hours after the addition of azobisdiisobutyronitrile at the end of which time the contents of the reaction flask are poured into methanol, forming a precipitate. The precipitate is collected on a Büchner funnel and washed first with methanol and then with acetone and dried. The polymer yield is 27.1 grams or about 90%.

Relative viscosity measurements are 1.31 and 1.48 in chlorobenzene and tetrahydrofuran, respectively.

A photoelectrostatic member is prepared by dissolving 5 grams poly(7-vinyl-monoiodo-7H-benzo[c]carbazole) in 65 grams of chlorobenzene. To the coating solution is added 1.5 grams of the sensitizer, 2,4,7-trinitrofluorenone-malononitrile which represents 30% by weight of the weight of polymer present in the solution. It is recommended that as solvents for the sensitizer, cyclohexanone, tetrahydrofuran or dioxane 1,4 or mixtures thereof be used. The solution was then applied to a suitable support material, such as aluminized Mylar film of 3 mil thickness, using conventional coating equipment, such as a meniscus coater or a trailing blade coater. The solution was applied at a rate sufficient to produce a photoconductive layer of about 0.2 to 0.3 mil in thickness after the evaporation of the solvent. Evaporation of the chlorobenzene from the solution is accomplished by passing the coated web through a heated forced air drying chamber maintained between 90° C. and 135° C.

EXAMPLE II

A photoelectrostatic member using poly(monoiodo-N-vinyl-benzo[b]carbazole.

The photoelectrostatic member of this example follows the procedures of Example I with the exception that the compound 5-(2-chloroethyl)-5H-benzo[b]carbazole is substituted for 7-(2-chloroethyl)-7H-benzo[c]carbazole. The coating weight, on a dry basis, also differs from Example I in that substrate is applied 0.5 gram per square foot and the resulting thickness of the coated layer is 0.45 mil.

EXAMPLE III

The photoelectrostatic member of this example follows the procedures of Example I with the exception that 6-(2-chloroethyl) - 6H - benzo[b,h]carbazole is substituted for 7-(2-chloroethyl) - 7H - benzo[c]carbazole. The resulting polymer is poly(monoiodo - 6 - vinyl - 6H - benzo[b,h]carbazole).

EXAMPLE IV

The photoelectrostatic member of this example follows the procedures described in Example I with the exception that 7-(2 - chloroethyl) - 7H - dibenzo[b,g]carbazole is substituted for the 7 - (2 - chloroethyl) - 7H - benzo[c]carbazole. The resulting polymer is poly(monoiodo-7-vinyl-7H-dibenzo[b,g]carbazole).

EXAMPLE V

The photoelectrostatic member of this example follows the steps of Example I with the exception that 7-(2-chloroethyl) - 7H - dibenzo[c,g]carbazole is substituted for the 7-(2-chloroethyl) - 7H - benzo[c]carbazole. The photoconductive polymer produced is poly(monoiodo-7-vinyl - 7H - dibenzo[c,g]carbazole). Another difference in the formulation is the percentage of the sensitizer which is reduced to 10% by weight of the weight of the polymer.

EXAMPLE VI

The photoelectrostatic member of this example was prepared by dissolving 10 grams of poly(7-vinyl-monoiodo - 7H - benzo[c]carbazole) in 190 grams of tetrahydrofuran. To the solution was added 1.7 grams of 2,7-dinitrofluorenonemalononitrile, which represented a sensitizer concentration of 17% by weight or 20 mole percent.

The solution was then applied to a base support of aluminized polyester film having a thickness of 3 mils using a meniscus type coating device. The coating solution is applied at a rate sufficient to produce a photoconductive layer that is 0.2 mil in thickness after the evaporation of the solvent by passing the coated substrate through a forced hot air drying oven.

EXAMPLE VII

The photoelectrostatic member of this example was prepared by combining 10 grams of poly (7-vinyl-monoiodo - 7H - benzo[c]carbazole) in solvent mixture comprised of 30 grams of tetrahydrofuran and 130 grams of cyclohexanone to the photoconductor solution was added 0.1 gram of 2,4,7 - trinitrofluorenonemalononitrile which represented a sensitizer concentration of 1% by weight or 1 mole percent. This solution was applied to an aluminized polyester base support of 5 mils thick at a rate sufficient to yield a dry coating thickness of 0.3 mil.

EXAMPLE VIII

The photoelectrostatic member of this example was prepared by putting in solution 10 grams of poly (7-vinyl-monoiodo - 7H - benzo[c]carbazole) in 30 grams of tetrahydrofuran and 70 grams of cyclohexanone. To the photoconductor solution was added 4.2 grams of 2,4,7-trinitrofluorenone which represented a sensitizer concentration of 42 percent by weight or 50 mole percent. The solution was applied to an aluminized polyester base having a 5-mil thickness at a rate sufficient to yield a dry coating thickness of 0.15 mil.

EXAMPLE IX

In this example a photoelectrostatic member was prepared by dissolving 10 grams of poly(7-vinyl-iodo-7H-benzo[c]carbazole) in 80 grams of cyclohexanone. To that solution was added 0.6 gram of phenanthrenequinone which represented a sensitizer concentration of 6% by weight or 11 mol percent. The solution was applied to an aluminized polyester substrate following the coating procedure set forth in Example VI.

EXAMPLE X

In this example a photoelectrostatic member was prepared by dissolving 10 grams of poly(7-vinyl-iodo-7H-benzo[c]carbazole) in a solvent mixture comprising 60 grams of tetrahydrofuran and 140 grams of cyclohexanone. To the photoconductor solution was added 10 grams of 2,4,5,7 - tetranitrofluorenone which represented a sensitizer concentration of 100 percent by weight of 100 mole percent. The solution was applied to a 3-mil thick aluminized polyester film at a rate sufficient to yield a dry coating thickness of 0.15 mil.

EXAMPLE XI

The photoelectrostatic member of this example was prepared by dissolving 10 grams of poly(7-vinyl-iodo-7H-benzo[c]carbazole) in a solvent mixture comprising 70 grams of tetrahydrofuran and 110 grams of methylene chloride. To the photoconductor solution was added 5.6 grams of 2-(p-t-butylphenyl)-4-2(2,4,7 - trinitrofluorenylidene) - 2 - oxazolin - 5 - one. The amount of sensitizer represented a concentration of 56 percent by weight or 40 mole percent. The solution was applied to an aluminized polyester base support of 5 mils in thickness at a rate sufficient to yield a dry coating thickness of 0.2 mil.

EXAMPLE XII

In this example a photoelectrostatic member was prepared by dissolving 10 grams of poly(7 - vinyl-iodo-7H-benzo[c]carbazole) in 190 grams of methylene chloride. To the solution was added 0.005 gram of crystal violet dye which represented a dye sensitizer concentration of 0.05% by weight. The coating solution was applied to an aluminized polyester substrate following the coating procedures set forth in Example VI.

EXAMPLE XIII

In this example a photoelectrostatic member was prepared by dissolving 10 grams of poly(7 - vinyl-iodo-7H-benzo[c]carbazole) in a solvent mixture comprising 40 grams of methylene chloride and 140 grams of chlorobenzene. To the photoconductor solution was added 0.1 gram of Rhodamine 6G dye which represented a 1% by weight of concentration of a dye sensitizer. The solution was applied to an aluminized polyester substrate following the coating procedure set forth in Example VI.

EXAMPLE XIV

The photoelectrostatic member of this example was prepared by dissolving 10 grams of poly(7-vinyl-iodo-7H-benzo[c]carbazole) in a solvent mixture comprising 80 grams of tetrahydrofuran and 120 grams of cyclohexanone. To the photoconductor solution was added 8.2 grams of 4-iodo - 2,5,7 - trinitrofluoroenone which represented a sensitizer concentration of 82% by weight or 70 mole percent. The solution was applied to a 3 mils thick aluminized polyester substrate at a rate sufficient to yield a dry coating thickness of 0.2 mil.

EXAMPLE XV

The photoelectrostatic member of this example was prepared by dissolving 10 grams of poly(7-vinyl-iodo-7H-benzo[c]carbazole) in a solvent mixture made up of 140 grams of tetrahydrofuran, 20 grams of cyclohexanone and 20 grams of dioxane. To the solvent solution containing the photoconductor was added 2.8 grams of:

2-(o-acetoxyphenyl) - 4 - (2,4,7-trinitro-9-fluorenylidene-)-2-oxazolin-5-one which represented a sensitizer concentration of 28% by weight or 20 mole percent. The final coating solution was applied to a 3 mils thick aluminized polyester substrate at a rate sufficient to yield a dry coating thickness of 0.2 mil.

EXAMPLE XVI

The photoelectrostatic member of this example was prepared by dissolving 10 grams of poly(7-vinyl-iodo-7H-benzo[c]carbazole) in a solvent mixture comprising 120 grams of tetrahydrofuran and 60 grams of dioxane. To the photoconductor solution was added 1.5 grams of:

2-benzyl-4-(2,4,7-trinitro-9-fluorenylidene) - 2 - oxazolin-5-one which represented a sensitizer concentration of 15% by weight or 10 mole percent. The solution was applied to a 3 mils thick aluminized polyester substrate at a rate sufficient to yield a dry coating thickness of 0.3 mil.

EXAMPLE XVII

The photoelectrostatic member of this invention was prepared following the procedure and formulation of Example VIII with the exception that 10.9 grams of 2,4,7 trinitrofluorenone was used in place of 4.2 grams which represented a sensitizer concentration of 109% by weight or 130 mole percent.

The sensitivity of all the foregoing samples range from 0.25 second to 0.35 second as the time required to decay the saturation charge to ½ value.

The photoconductive polynuclear polymeric material experiences its increased photosensitivity due to the introduction into the fused ring of the atom of iodine. While the precise location of the iodine atom in the structure is not precisely known, there is evidence that it most likely is introduced, as a result of the methods of preparation described earlier in the 4 carbon ring in the "10" position so that one of the typical compounds would be poly (7-vinyl-10-iodo-7H-benzo[c]carbazole) (Example I). However, in terms of the advancement made in this art, the precise location of the atom of iodine is not particularly significant since following the procedures set forth above, iodination is known to occur which does significantly adherence the photoconductive polymer.

In the foregoing description, reference is made to coating thickness, coating weights as well as weight percentages of the components for the purpose of more clearly defining the general nature of the novel feature of the invention which is the substitution of iodine into the fused ring of the photoconductive polymer used in the preparation of the specific material and is intended that such details are for the purposes of illustration.

What is claimed is:

1. A photoconductive member comprising a conductive base support having a conductivity of at least $10^{-11}$ mhos./cm. coated with a uniform continuous film comprising an organic photoconductive polymer having the formula:

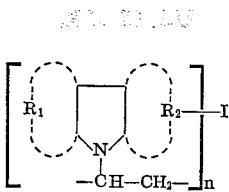

in which $R_1$ and $R_2$ are each fused arenic ring structures selected from the group consisting of benzo and naphtho, one of said fused arenic structures being a naphtha ring and wherein one of said ring structures is substituted with an atom of iodine.

2. The photoconductive member as claimed in claim 1 wherein the compound is poly(5-vinyl-monoiodo-5H-benzo[b]carbazole).

3. The photoconductive member as claimed in claim 1 wherein the compound is poly(7-vinyl-monoiodo-7H-benzo[c]carbazole).

4. The photoconductive member as claimed in claim 1 wherein the compound is poly(7-vinyl-monoiodo-7H-dibenzo[c,g]carbazole).

5. The photoconductive member as claimed in claim 1 wherein the compound is poly(6-vinyl-monoiodo-6H-dibenzo[b,h]carbazole).

6. The photoconductive member as claimed in claim 1 wherein the compound is poly(7-vinyl-monoiodo-7H-dibenzo[b,g]carbazole).

7. The method of making a reproduction by photoelectrostatic techniques comprising the exposure of a charged photoconductive member to a pattern of light and shadow, said photoconductive member comprising a conductive base support having a conductivity of at least $10^{-11}$ mhos./cm. and having applied thereon an organic polymeric material having the following general formula:

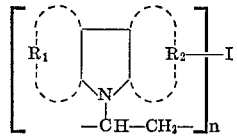

in which $R_1$ and $R_2$ are each fused arenic ring structures selected from the group consisting of benzo and naphtho, one of said fused arenic structures being a naphtha ring and wherein one of said ring structures is substituted with ana atom of iodine.

8. The method as claimed in claim 7 wherein the photoconductive member is poly(5-vinyl-monoiodo-5H-benzo[b]carbazole).

9. The method as claimed in claim 7 wherein the photoconductive member is poly(7-vinyl-monoiodo-7H-benzo[c]carbazole).

10. The method as claimed in claim 7 wherein the photoconductive member is poly(7-vinyl-monoiodo-7H-dibenzo[c,g]carbazole).

11. The method as claimed in claim 7 wherein the photoconductive member is poly(6-vinyl-monoiodo-6H-dibenzo[b,h]carbazole).

12. Th method as claimed in claim 7 whrein the photoconductive member is poly(7-vinyl-monoiodo-7H-dibenzo[b,g]carbazole).

13. The photoconductive member as claimed in claim 1 including a sensitizer present in an amount ranging from 0.01% to 50% by weight of the weight of the photoconductive polymer.

14. The photoconductive member as claimed in claim 13 wherein the sensitizer is 2,4,7-trinitrofluorenonemalononitrile.

15. A photoconductive member comprising a conductive base support having a conductivity of at least $10^{-11}$ mhos/cm. and having applied thereon a photoconductive layer comprising an organic photoconductive polymer having the formula:

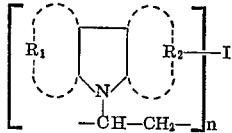

in which $R_1$ and $R_2$ are each fused arenic ring structures selected from the group consisting of benzo and naphtho, one of said fused arenic structures being a naphtho ring and wherein one of said ring structures is substituted with an atom of iodine and including a sensitizer selected from the group consisting of $\pi$-acid acceptors and organic dyes.

16. The photoconductive member as claimed in claim 15 wherein the $\pi$-acid sensitizer is present in an amount based on the weight of the photoconductive polymer ranging from 0.01% to 110% by weight.

17. The photoconductive member as claimed in claim 15 wherein the organic dye is present in an amount based on the weight of the photoconductive polymer ranging from 0.01% to 5.0% by weight.

18. The photoconductive member as claimed in claim 15 wherein the sensitizer is 2,4,7-trinitrofluorenone.

19. The photoconductive member as claimed in claim 15 wherein the sensitizer is 2-(p-t-butyl phenyl)-4-(2,4,7-trinitrofluorenylidene)-2-oxazolin-5-one.

20. The photoconductive member as claimed in claim 15 wherein the sensitizer is 2-(o-acetoxyphenyl)-4-(2,7-dinitro-9-fluorenylidene)-2-oxazolin-5-one.

21. The photoconductive member as claimed in claim 15 wherein the sensitizer is 2-(o-acetoxyphenyl)-4-(2,7-dinitro-9-fluorenylidene)-2-oxazolin-5-one.

22. The photoconductive member as claimed in claim 15 wherein the sensitizer is 2-(o-methoxyphenyl)-4-(2,4,7-trinitro-9-fluorenylidene)-2-oxalin-5-one.

23. The photoconductive member as claimed in claim 15 wherein the sensitizer is 2-(p-chlorophenyl)-4-(2,4,7-trinitro-9-fluorenylidene)-2-oxazolin-5-one.

24. The method of making a reproduction of photoelectrostatic techniques comprising the exposure of a charged photoconductive member to a pattern of light and shadow, said photoconductive member comprising a conductive base support having a conductivity of at least $10^{-11}$ mhos/cm. and having applied thereon a photoconductive layer comprising an organic polymeric material having the following formula:

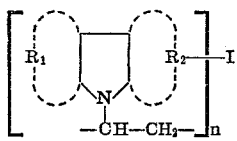

in which $R_1$ and $R_2$ are each fused arenic ring structures selected from the group consisting of benzo and naphtho, one of said fused arenic structures being a naptho ring and wherein one of said ring structures is substituted with an atom of iodine and including a sensitizer selected from the group consisting of $\pi$-acid acceptors and organic dyes.

References Cited

UNITED STATES PATENTS

| | | | |
|---|---|---|---|
| 3,155,503 | 11/1964 | Cassiers | 96—1.5 X |
| 3,441,947 | 4/1969 | Schmiedel et al. | 96—1 X |
| 3,307,940 | 3/1967 | Hoegl et al. | 96—1.5 X |
| 3,615,412 | 10/1971 | Hessel | 96—1.5 |
| 3,697,264 | 10/1972 | Podhajny | 96—1.5 |

FOREIGN PATENTS

| | | | |
|---|---|---|---|
| 7,591 | 3/1968 | Japan | 96—1.5 |
| 7,592 | 3/1968 | Japan | 96—1.5 |

NORMAN G. TORCHIN, Primary Examiner

J. R. MILLER, Assistant Examiner

U.S. Cl. X.R.

96—1 PC, 1.5; 252—501; 260—88.3 R, 315

UNITED STATES PATENT OFFICE
CERTIFICATE OF CORRECTION

Patent No. 3,764,316                    Dated October 9, 1973

Inventor(s) Earl E. Dailey; Jerry M. Barton; Ralph L. Minnis and Evan S. Baltazzi It is certified that error appears in the above-identified patent and that said Letters Patent are hereby corrected as shown below:

Column 4, Line 46 should read:

(2) 2-(O-acetoxyphenyl)-4-(2, 4, 7-trinitro-9-fluorenylidene)-2-oxazolin-5-one

Column 6, Line 23, numeral 3.030 should read 0.030.

Signed and sealed this 30th day of April 1974.

(SEAL)
Attest:

EDWARD M. FLETCHER, JR.
Attesting Officer

C. MARSHALL DANN
Commissioner of Patents